US011500616B1

(12) United States Patent
Wang et al.

(10) Patent No.: US 11,500,616 B1
(45) Date of Patent: Nov. 15, 2022

(54) TRUE RANDOM NUMBER GENERATOR CIRCUIT

(71) Applicant: Ambarella International LP, Santa Clara, CA (US)

(72) Inventors: Xuan Wang, San Jose, CA (US); Tianwei Liu, Santa Clara, CA (US); Guangjun He, San Jose, CA (US); Hejia Yan, Sunnyvale, CA (US)

(73) Assignee: Ambarella International LP, Santa Clara, CA (US)

( * ) Notice: Subject to any disclaimer, the term of this patent is extended or adjusted under 35 U.S.C. 154(b) by 322 days.

(21) Appl. No.: 16/942,157

(22) Filed: Jul. 29, 2020

(51) Int. Cl.
*G06F 7/58* (2006.01)

(52) U.S. Cl.
CPC .................................... *G06F 7/588* (2013.01)

(58) Field of Classification Search
CPC ................................................ G06F 7/58–588
See application file for complete search history.

(56) References Cited

U.S. PATENT DOCUMENTS

| | | | | |
|---|---|---|---|---|
| 7,613,756 B1 * | 11/2009 | Zhu | G06F 7/588 708/250 |
| 2008/0136697 A1 * | 6/2008 | Cho | G06F 7/588 341/155 |
| 2010/0146025 A1 * | 6/2010 | Ergun | H04L 9/001 708/251 |

OTHER PUBLICATIONS

C. S. Petrie and J. A. Connelly, "A noise-based IC random number generator for applications in cryptography," in IEEE Transactions on Circuits and Systems I: Fundamental Theory and Applications, vol. 47, No. 5, pp. 615-621, May 2000, doi: 10.1109/81.847868. (Year: 2000).*

W. Chen et al., "A 1.04 μW Truly Random Number Generator for Gen2 RFID tag," 2009 IEEE Asian Solid-State Circuits Conference, 2009, pp. 117-120, doi: 10.1109/ASSCC.2009.5357193. (Year: 2009).*

W. Mao, Y. Li, C.-H. Heng and Y. Lian, "Zero-bias true random number generator using LFSR-based scrambler," 2017 IEEE International Symposium on Circuits and Systems (ISCAS), 2017, pp. 1-4, doi: 10.1109/ISCAS.2017.8050474. (Year: 2017).*

B. Sunar et al., A Provably Secure True Random Number Generator with Built-in Tolerance to Active Attacks, Mar. 29, 2006, pp. 1-32.

* cited by examiner

*Primary Examiner* — Khoa D Doan
*Assistant Examiner* — Vivian Diem Ha Ledynh
(74) *Attorney, Agent, or Firm* — Christopher P. Maiorana, PC

(57) ABSTRACT

An apparatus comprises a noisy bias voltage generator circuit, a random seed generator circuit, and a random series generator circuit. The noisy bias voltage generator circuit may be configured to generate a plurality of noisy bias voltages in response to a plurality of input voltage signals and a first bias current signal. The random seed generator circuit may be configured to generate a random seed in response to the plurality of noisy bias voltages and a second bias current signal. The random series generator circuit may be configured to generate a series of true random bits in response to the random seed and a clock signal.

20 Claims, 7 Drawing Sheets

TRUE RANDOM NUMBER GENERATOR CIRCUIT

FIELD OF THE INVENTION

The invention relates to random number generation generally and, more particularly, to a method and/or apparatus for implementing a true random number generator circuit.

BACKGROUND

True random number/series is an essential part obtaining reliability and security in modern electronic systems. Most of the conventional solutions are based on processing pseudo random series generated by a linear feedback shift register (LFSR), ring oscillator stage outputs, or an Exclusive-OR (XOR) tree. There are also numerous true random number generators (TRNGs) that use the behavior of a metastable state of logic gates.

Conventional solutions involve a trade off between randomness and hardware scale and power consumption. An existing ring oscillator and XOR tree based design uses more than one hundred ring oscillators to achieve certain randomness. Sometimes chip condition and process corners will also ruin the desired metastable state of logic gates.

It would be desirable to implement a true random number generator circuit.

SUMMARY

The invention concerns an apparatus comprising a noisy bias voltage generator circuit, a random seed generator circuit, and a random series generator circuit. The noisy bias voltage generator circuit may be configured to generate a plurality of noisy bias voltages in response to a plurality of input voltage signals and a first bias current signal. The random seed generator circuit may be configured to generate a random seed in response to the plurality of noisy bias voltages and a second bias current signal. The random series generator circuit may be configured to generate a series of true random bits in response to the random seed and a clock signal.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a true random number generator circuit that may (i) generate a white true random series, (ii) utilize thermal noise of a resistor array, (iii) utilize an amplifier to increase noise without increasing footprint of resistor array, (iv) utilize low power, high gain voltage controlled oscillators (VCOs) with high flicker noise to further increase randomness, (v) use one VCO output to sample another VCO output to create a series of pink random seeds, (vi) utilize a linear feedback shift register (LFSR) to whiten the series of pink random seeds, (vii) provide true random security keys, (viii) be used for DRAM communication encryption on a SoC, and/or (ix) be implemented as one or more integrated circuits.

Figure 1:
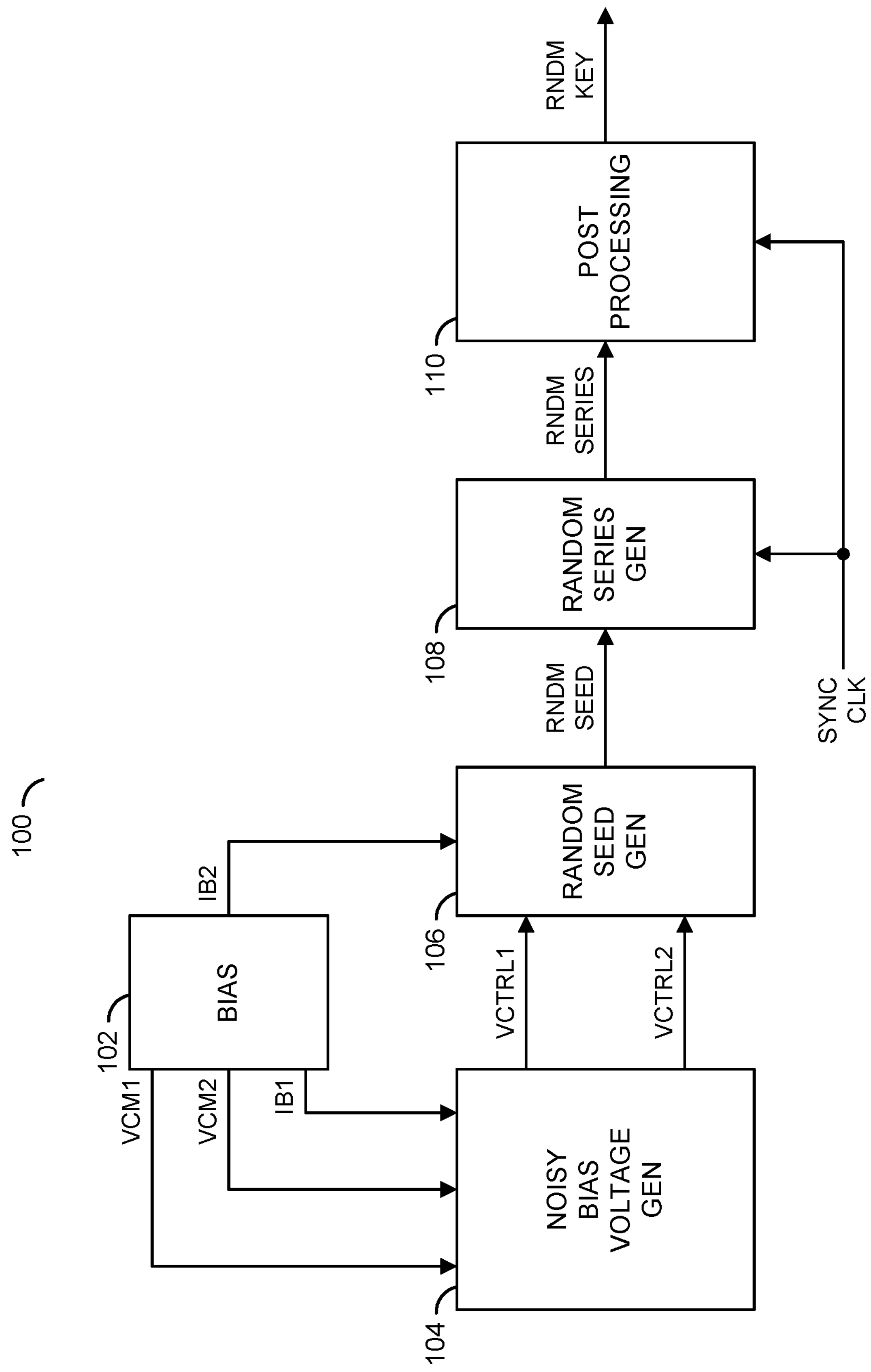
FIG. 1 is a block diagram illustrating a true random number generator circuit in accordance with an example embodiment of the invention.

Referring to FIG. 1, a block diagram of a circuit 100 is shown illustrating a true random number generator circuit in accordance with an example embodiment of the invention. In an example, the circuit 100 may comprise a block (or circuit) 102, a block (or circuit) 104, a block (or circuit) 106, a block (or circuit) 108, and a block (or circuit) 110. The circuit 102 may implement a bias circuit. The circuit 104 may implement a noisy bias voltage generator circuit. The circuit 106 may implement a random seed generator circuit. The circuit 108 may implement a random series generator circuit. The circuit 110 may implement a post processing circuit.

In an example, the circuit 102 may be configured to provide both bias voltages and bias currents for other circuits (or sub-modules) of an apparatus including the circuit 100. In an example, the circuit 102 may be configured to generate a first bias signal (e.g., VCM1), a second bias signal (e.g., VCM2), a third bias signal (e.g., IB1), and a fourth bias signal (e.g., IB2). The signals VCM1 and VCM2 may be common mode voltage signals. In an example, the signals VCM1 and VCM2 may be simply obtained using a number of resistors connected in series between a supply voltage and a circuit ground potential. A level of the signals VCM1 and VCM2 may be selected from near the circuit ground potential to near the supply voltage. A step size of the level of the signals VCM1 and VCM2 may be determined by a granularity of the resistance values to total resistance of the resistors connected in series. The signals IB1 and IB2 may be current bias signals. In an example, the current bias signals IB1 and IB2 may be obtained by mirroring a reference current. In an example, an external current source (e.g., a 15 μA current from a bandgap reference, etc.) may be used as the bias reference current.

The common mode voltage signals VCM1 and VCM2 may be used to bias a first noise source and a second noise source, respectively. In an example, the common mode voltage signals VCM1 and VCM2 may be presented as a common mode of respective control voltages for respective voltage controlled oscillators. In an example, the signals IB1 and IB2 may be used to bias amplifiers and VCOs. In an example, the common mode voltage signals VCM1 and VCM2 and the current bias signal IB1 may be presented to inputs of the circuit 104. In an example, current bias signal IB2 may be presented to an input of the circuit 106.

In an example, the circuit 104 may have a first output that may present a first signal (e.g., VCTRL1) and a second output that may present a second signal (e.g., VCTRL2). In an example, the signals VCTRL1 and VCTRL2 may be implemented as control voltages. In an example, the signals VCTRL1 and VCTRL2 may be implemented as VCO control voltages. In an example, the signals VCTRL1 and VCTRL2 may be presented to a first input and a second input, respectively, of the circuit 106. The signal IB2 may be present presented to a third input of the circuit 106. The circuit 106 may have an output that may present a signal (e.g., RNDM SEED). In an example, the signal RNDM SEED may communicate a series of pink random seeds.

In an example, the signal RNDM SEED may be presented to a first input of the circuit 108. A signal (e.g., SYNC CLK) may be presented to a second input of the circuit 108. The signal SYNC CLK may be implemented as a clock signal. In an example, the signal SYNC CLK may be configured to synchronize one or more sub-modules of the circuit 100 with each other and/or with other sub-modules of the apparatus containing the circuit 100. In an example, the circuit 108 may be configured to present a signal (e.g., RNDM SERIES) at an output. In an example, the circuit 108 may be configured to whiten the series of pink random seeds generated by the circuit 106. In an example, the circuit 108 may be configured to generate the signal RNDM SERIES in response to the signal RNDM SEED and the signal SYNC CLK. In an example, the signal RNDM SERIES may communicate a series of true random bits.

In an example, the circuit 110 may have a first input that may receive the signal RNDM SERIES, a second input that may receive the signal SYNC CLK, and an output that may present a signal (e.g., RNDM KEY). The circuit 110 may be configured to generate the signal RNDM KEY in response to the signal RNDM SERIES and the signal SYNC CLK. In an example, the signal RNDM KEY may communicate random key bytes. In an example, the signal RNDM KEY may provide true random security key bytes for communication channel encryption. In an example, the signal RNDM KEY may provide true random security key bytes for dynamic random access memory (DRAM) communication encryption on an integrated circuit (e.g., a system on chip (SoC)). In an example, the post processing circuit 110 may be configured to generate the random key bytes in response to the series of true random bits utilizing one or more of a von Neumann corrector, an extractor function, and a one-way hash function. In an example embodiment, the post processing circuit 110 may comprise a plurality of first-in first-out (FIFO) memories. In an example, a predetermined number (e.g., 128, 256, etc.) of random bits from the circuit 108 may be stored with a programmable sampling rate into the plurality of FIFO memories. The random data in the FIFO memories may be used as keys for security related operations (e.g., DRAM scrambling, etc.).

Figure 2:
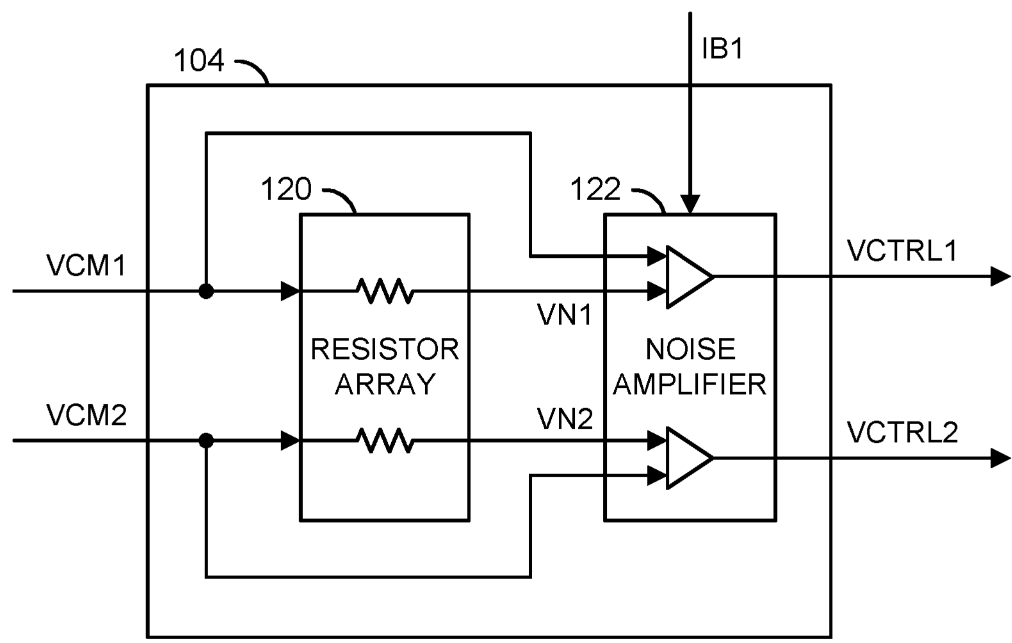
FIG. 2 is a diagram illustrating an example implementation of the noisy bias voltage generator circuit in accordance with an embodiment of the invention.

Referring to FIG. 2, a diagram is shown illustrating an example implementation of a noisy bias voltage generator circuit in accordance with an embodiment of the invention. In an example, the circuit 104 may comprise a block (or circuit) 120 and a block (or circuit) 122. The circuit 120 may be implemented as a resistor array. The circuit 122 may be implemented as a noise amplifier circuit. In an example, the signal VCM1 may be presented to a first input of the circuit 120 and a first input of the circuit 122, the signal VCM2 may be presented to a second input of the circuit 120 and a second input of the circuit 122, and the signal IB1 may be presented to a third input of the circuit 122. A first output of the circuit 120 may present a signal (e.g., VN1) to a fourth input of the circuit 122. A second output of the circuit 120 may present a signal (e.g., VN2) to a fifth input of the circuit 122. A first output of the circuit 122 may present the signal VCTRL1. A second output of the circuit 122 may present the signal VCTRL2. In an example, the signals VN1 and VN2 generally provide bias voltage signals containing random noise.

In an example, the circuit 120 may be implemented as a resistor array comprising a number of very large (e.g., hundreds of kilo-Ohms level) integrated resistances. The integrated resistances generally provide thermal noise. In an example, a spectrum of the thermal noise (e.g., Sv(f)) of a resistor is proportional to the resistance (R) and the temperature (T), as illustrated by the following equation 1:

$$Sv(f)=4kTR. \quad \text{EQ. 1}$$

In an example, the circuit 120 may comprise a number (e.g., 2) of series metal resistances coupling the common mode bias voltages VCM1 and VCM2 to the respective inputs of the noise amplifier circuit 122. In an example, variation between the two series metal resistances should generally be minimized, because a systematic bias during fabrication may cause deterministic jitter, which may affect randomness. In various embodiments, more series (as opposed to parallel) resistance is generally helpful on randomness. The thermal noise of the series metal resistances is added to the common mode bias voltages VCM1 and VCM2 producing the noisy bias voltage signals VN1 and VN2, respectively.

In an example, the signal VCM1 may be presented to a first terminal of a first resistor of the resistor array of the circuit 120 and the signal VCM2 may be presented to a first terminal of a second resistor of the resistor array of the circuit 120. A second terminal of the first resistor of the resistor array of the circuit 120 generally presents the signal VN1. A second terminal of the second resistor of the resistor array of the circuit 120 generally presents the signal VN2.

In an example, the circuit 122 may comprise a number of operational amplifiers (opamps) corresponding to the number of resistors in the resistor array of the circuit 120. The opamps of the circuit 122 are generally biased by the bias current IB1. In an example, a first opamp of the circuit 122 receives the signal VCM1 at a first input, receives the signal VN1 at a second input, and presents the signal VCTRL1 at an output. In an example, a second opamp of the circuit 122 receives the signal VCM2 at a first input, receives the signal VN2 at a second input, and presents the signal VCTRL2 at an output. The noise amplifier circuit 122 is generally configured to increase randomness, which means more noise, while not significantly increasing an area of the resistor array of the circuit 120. The opamps of the circuit 122 generally amplify a thermal noise component imposed on the common mode bias voltages VCM1 and VCM2 by the respective resistors of the resistor array of the circuit 120 and present the amplified noise as the signals VCTRL1 and VCTRL2. In an example, the noisy bias voltages VN1 and VN2 are amplified separately by the operational amplifiers using a negative feedback connection to provide a well controlled loop gain.

Figure 3:
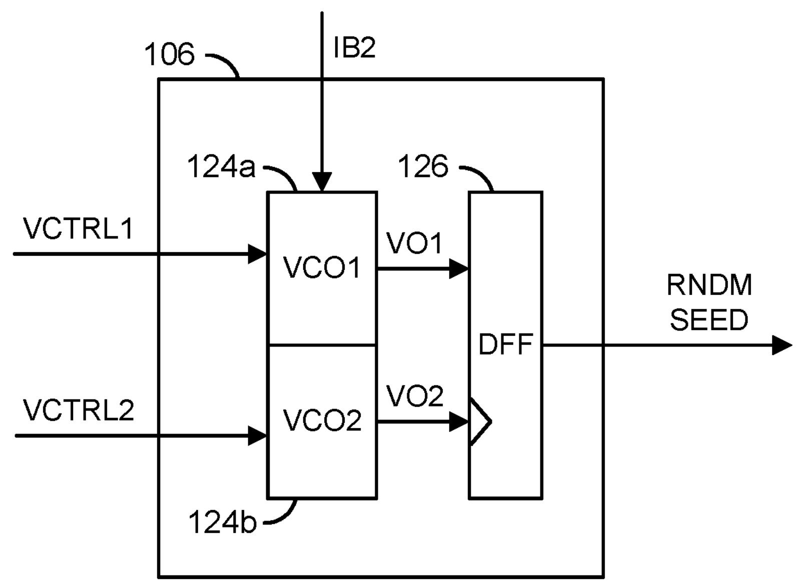
FIG. 3 is a diagram illustrating an example implementation of a random seed generator circuit in accordance with an embodiment of the invention.

Referring to FIG. 3, a diagram is shown illustrating an example implementation of a random seed generator circuit in accordance with an example embodiment of the invention. In an example, the circuit 106 may comprise a block (or circuit) 124*a*, a block (or circuit) 124*b*, and a block (or circuit) 126. The circuits 124*a* and 124*b* may implement voltage controlled oscillators (VCOs). The circuit 126 may be implemented as a D-type flip-flop (DFF). The VCOs 124*a* and 124*b* may be biased by the signal IB2. The VCO 124*a* may have a first input that may receive the signal VCTRL1 and an output that may present a signal (e.g., VO1). The VCO 124*b* may have a first input that may receive the signal VCTRL2 and an output that may present a signal (e.g., VO2). In an example, the signal VO1 may be presented to a data input of the circuit 126 and the signal VO2 may be presented to a clock input of the circuit 126. In another example, the connections of the signals VO1 and VO2 to the circuit 126 may be exchanged. An output of the circuit 126 may present the signal RNDM SEED. In the example illustrated in FIG. 3, the output VO1 of the VCO 124*b* is used to sample the output VO1 of the VCO 124*a*. The samples are then presented by the signal RNDM SEED.

The outputs VO1 and VO2 of the VCOs 124*a* and 124*b*, respectively, generally comprise a large random jitter. In an example, even when VCM1=VCM2 there is a significant probability of a leading relationship between output edges of the VCOs 124*a* and 124*b* changing. In an example, the two VCOs 124*a* and 124*b* with predetermined control voltages VCTRL1 and VCTRL2, respectively, are free-running. Long-term random jitter may be observed on the respective output clock signals VO1 and VO2. When the signals VCTRL1 and VCTRL2 include injected noise, the scale of the random jitter may be increased. With the time of observation increasing, the jitter may even be comparable with a clock cycle. When the jitter is comparable with the clock cycle, the relationship between the rising edges of each output of the VCOs 124*a* and 124*b* may be uncertain (e.g. VCO1 leading/VCO2 leading may change randomly).

In general, VCOs are a familiar part in phase locked loops (PLLs). However, unlike in a PLL, the circuit 122 generally takes advantage of noise of the VCOs 124*a* and 124*b* to increase randomness. In an example, the VCOs 124*a* and 124*b* of the circuit 122 are generally implemented comprising low power and high gain, and with high flicker noise.

Figure 4:
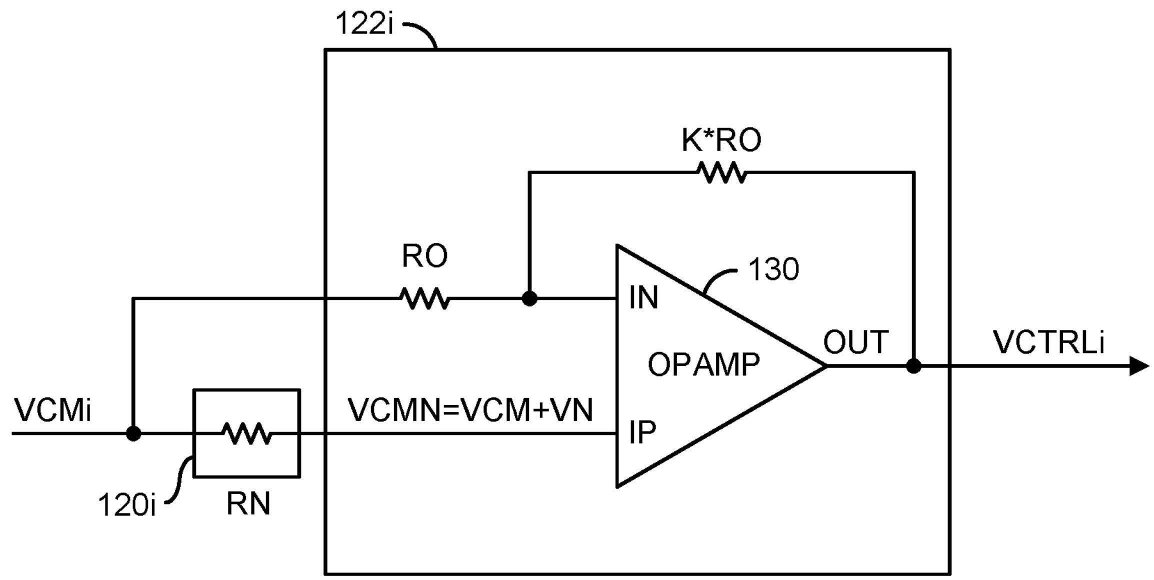
FIG. 4 is a diagram illustrating an example implementation of a noise amplifier circuit of FIG. 2.

Referring to FIG. 4, a diagram is shown illustrating an example implementation of a noise amplifier circuit of FIG. 2. In an example, a portion 122*i* of the noise amplifier circuit 122 may comprise an opamp 130, a first resistor, and a second resistor. A first terminal of the first resistor may receive a bias voltage signal VCMi. A second terminal of the first resistor may be connected to a negative input of the opamp 130. A first terminal of the second resistor may be connected to the negative input of the opamp 130. A second terminal of the second resistor may be connected to an output of the opamp 130. The first resistor may have a resistance value of RO. The second resistor may have a resistance value of K*RO. A noisy voltage signal VNi from the resistor array 120 may be presented to a positive input of the opamp 130.

In general, each portion 122*i* of the noise amplifier circuit 122 is generally configured as an operational amplifier with negative feedback. Assuming the opamp 130 is ideal, a relationship between an output voltage VCTRLi and the noisy voltage signal VNi may be expressed by the following equations 2 and 3:

$$\frac{VCMi - (VCMi + VNi)}{RO} = \frac{(VCMi + VNi) - VCTRLi}{KRO} \quad \text{EQ. 2}$$

$$\Rightarrow VCTRLi = VCMi + (K+1)VNi, \quad \text{EQ. 3}$$

where RO may be relatively very small compared with RN, VNi is the noise voltage of RN, and K is the gain of noise amplifier 122*i*. The larger K is, the larger the noise provided to the voltage signal VCTRLi. However, considering a loading effect and existence of VCO input capacitance, to avoid making the noise too "pink" (e.g., the noise is low pass filtered and no longer white), K should not be made too large. In an example, K=10 may be used.

Figure 5:
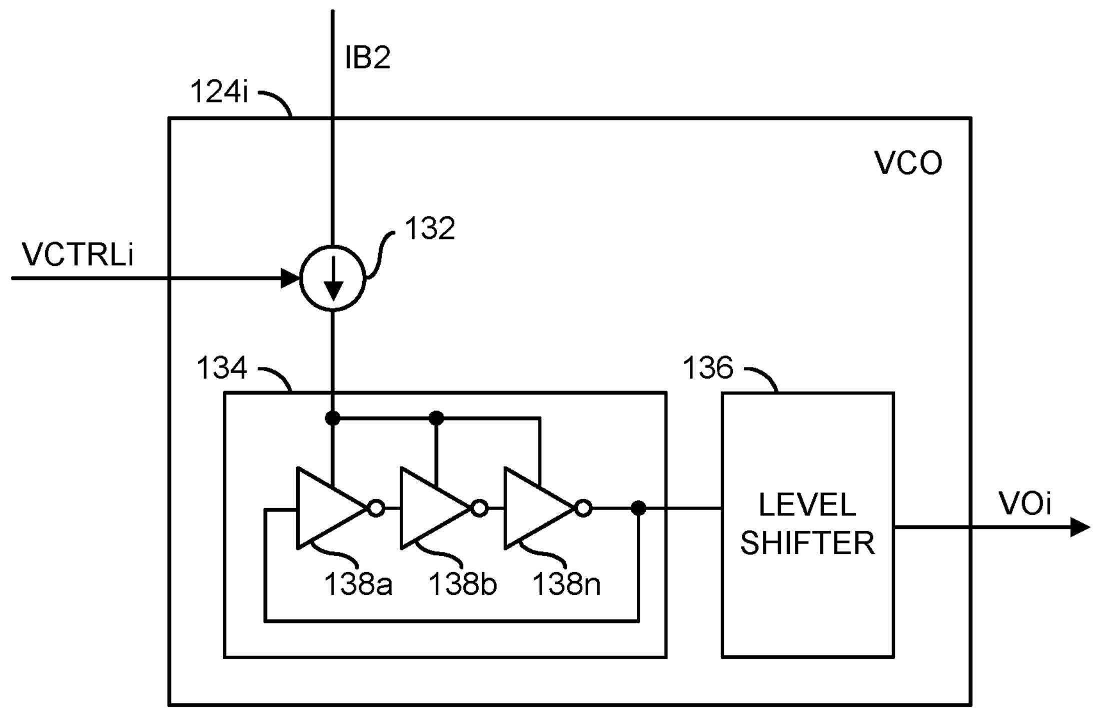
FIG. 5 is a diagram is shown illustrating an example implementation of a voltage controlled oscillator (VCO) circuit of FIG. 3.

Referring to FIG. 5, a diagram is shown illustrating an example implementation of a voltage controlled oscillator (VCO) circuit of FIG. 3. A VCO is a familiar part in a phase locked loop (PLL). However, unlike in PLLs, various embodiments of the circuit 100 take advantage of the noise of the VCO to increase randomness. In an example, a low power, high gain VCO with high flicker noise may be implemented. In an example, a VCO 124*i* may comprise a voltage controlled current source 132, a ring oscillator 134, and a level shifter 136. In general, the voltage controlled current source 132 is generally configured to control an amount of current presented to the ring oscillator circuit 134 according to an input voltage (e.g., a control voltage VCTRLi). In an example, the ring oscillator circuit 134 may comprise a plurality of inverters 138*a*-138*n* connected in series with an output of a last inverter connected to an input of the first inverter. In an example, the ring oscillator circuit 134 may be implemented as a 3-stage ring oscillator driven by the voltage controlled current source 132. The level shifter 136 is generally configured to ensure the output signal VOi is compliant with input voltage (or logic) levels of the circuit 126.

Figure 6:
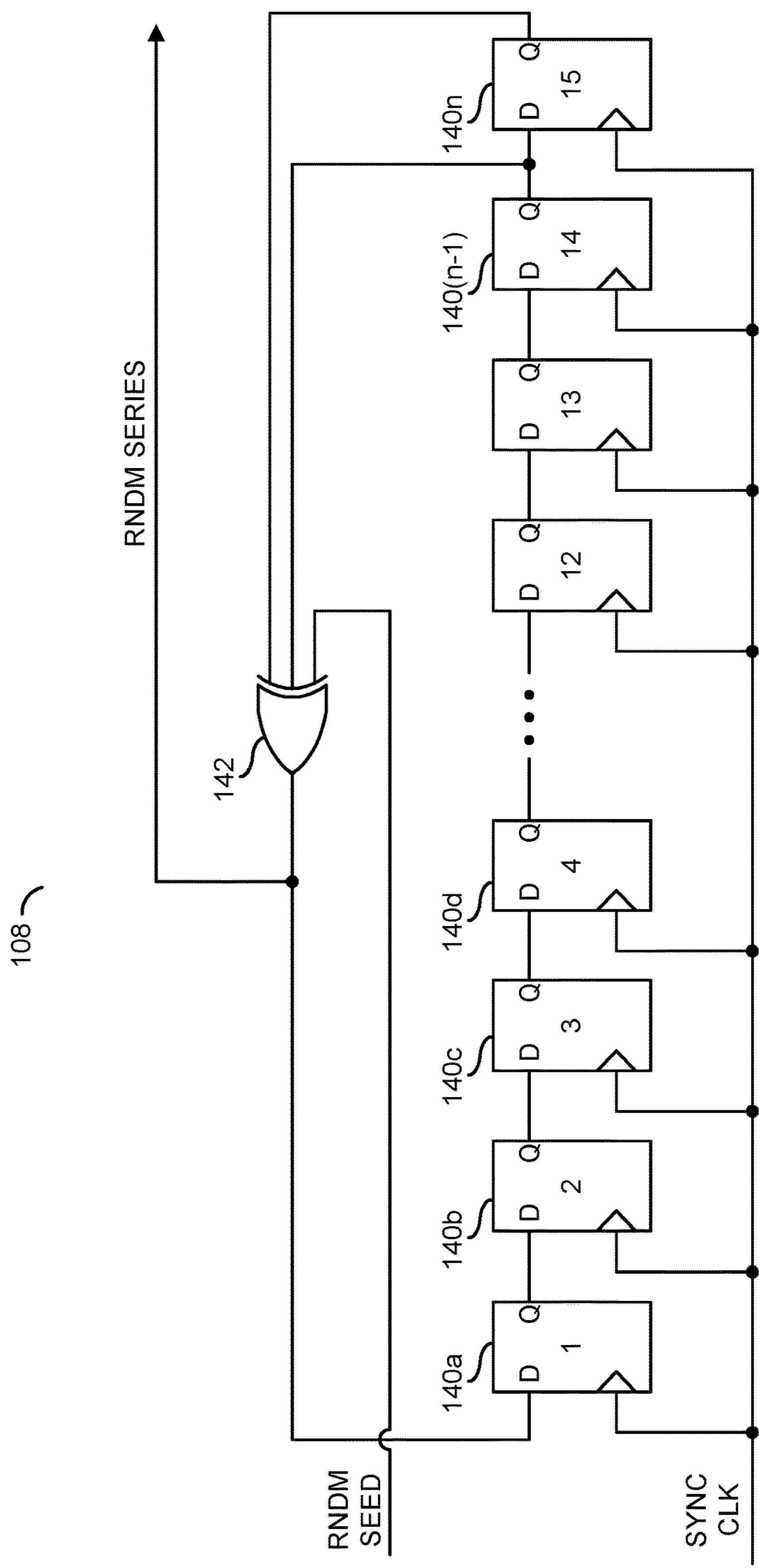
FIG. 6 is a diagram illustrating an example implementation of a random series generator circuit in accordance with an embodiment of the invention.

Referring to FIG. 6, a diagram is shown illustrating an example implementation of a random series generator circuit in accordance with an embodiment of the invention. In an example, the random series generator circuit 108 may be implemented with a linear feedback shift register (LFSR). The LFSR may be used to whiten a pink random series. In an example, the LFSR implementing the random series generator circuit 108 may comprise a number of D-type flip-flops (DFFs) 140*a*-140*n* and an Exclusive-OR (XOR) gate 142. In an example, a fifteen stage LFSR may be implemented with a three-input XOR gate. In an example, the DFFs 140*a*-140*n* may be connected in series. The signal SYNC CLK may be presented to each clock input of the DFFs 140*a*-140*n*. The signal RNDM SEED may be presented to a first input of the XOR 142. A second input of the XOR 142 may be connected to an output of the DFF 140*n*. A third input of the XOR 142 may be connected to an output of the DFF 140(*n*−1). An output of the XOR 142 may be connected to a data input of the DFF 140*a*. The signal RNDM SERIES may be presented at the output of the XOR 142. In an example, a feedback polynomial of the fifteen stage LFSR implementing the random series generator circuit 108 may be written as $x^{15}+x^{14}+1$, meaning when taking 14th and 15th stage of register output as feedback, the maximum length polynomial is obtained. After injecting the random seed (e.g., via the XOR seed bit) and feeding back the 14th and 15th register outputs, the output of the fifteen stage LFSR may be considered as a white true random series.

Figure 7:
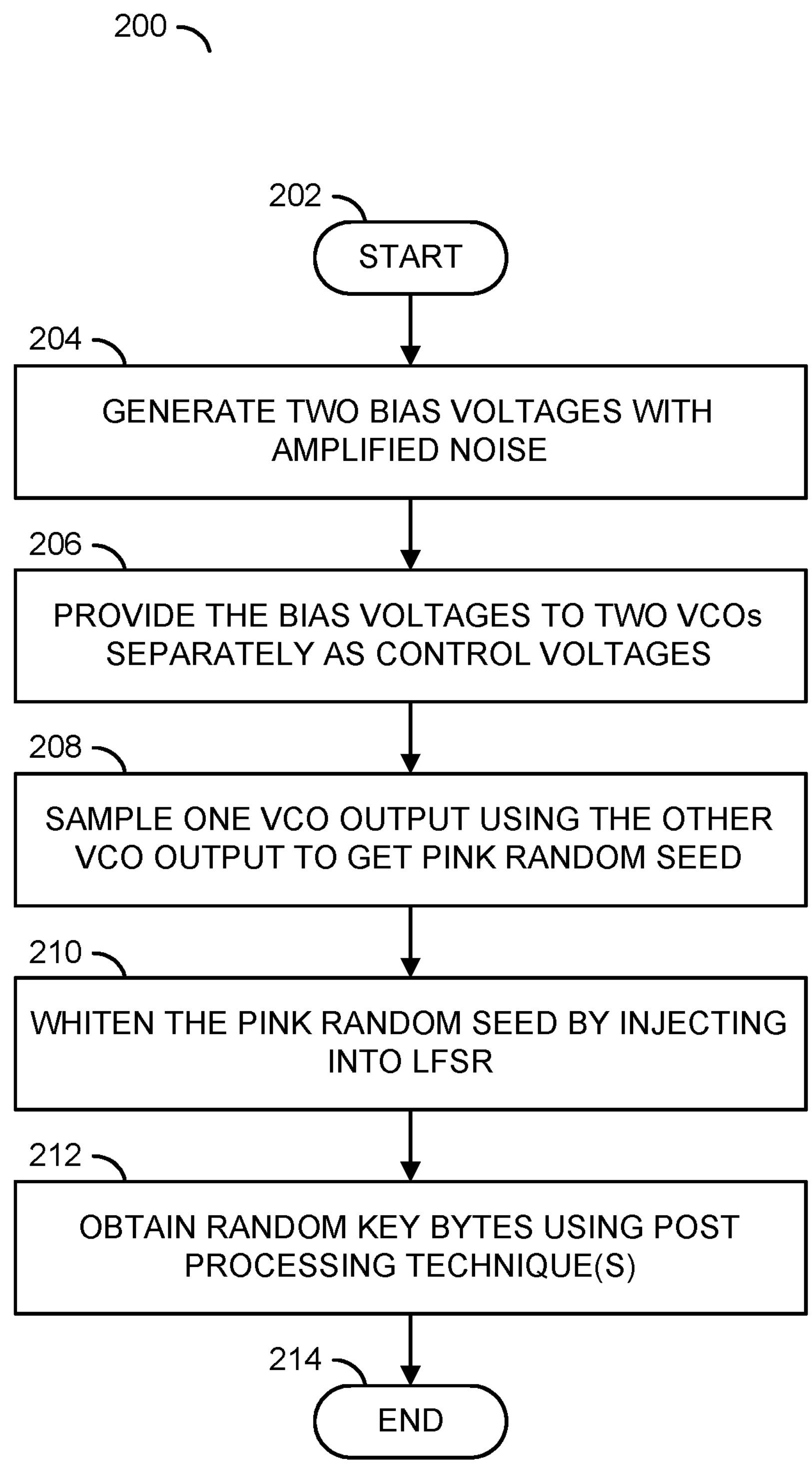
FIG. 7 is a flow diagram illustrating a process of generating a true random number in accordance with an example embodiment of the invention.

Referring to FIG. 7, a flow diagram is shown illustrating a process of generating a true random number in accordance with an example embodiment of the invention. In an example, a process (or method) 200 may comprise a step (or state) 202, a decision step (or state) 204, a step (or state) 206, a step (or state) 208, a step (or state) 210, a step (or state) 212, and a step (or state) 214. The process 200 may begin in the step 202 and move to the step 204. In the step 204, the process 200 may generate two bias voltages comprising amplified noise. A primary noise source for each bias voltage may be thermal noise from a respective large series resistance. In an example, increasing an amount of the series resistance may improve randomness. In an example, the noise sources may be amplified separately by operational amplifiers with a negative feedback connection, thus the loop gain is well controlled.

In the step 206, the process 200 may provide the amplified noise sources to two identical free running voltage controlled oscillators (VCOs) as control voltages. The more noise on a free running VCO control voltage, the more phase jitter presented on the VCO output edges. In the step 206, random noise from the two VCO control voltages is transferred into random jitter on the outputs of the two VCOs. In the step 208, one of the VCO outputs is used to sample the other VCO output to obtain a pink random seed. The random seed here is no longer white noise because low frequency flicker noise is introduced by devices in both the resistance array 120 and the VCOs 124*a* and 124*b*. Also, the input of each of the VCOs 124*a* and 124*b* may be considered as a low pass filter.

In the step 210, the pink random seed may be whitened by injecting the pink random seed into a feedback Exclusive-OR (XOR) gate of a linear feedback shift register (LFSR). In an example, a fifteen stage LFSR may be implemented, providing 32767 random cycles if seed is fixed. The output of the LFSR will be a 1 bit true random stream. In the step 212, the 1 bit true random stream may be presented to a post processing circuit to save and transform the random stream of bits into one or more multi-byte random keys. In an example, the post processing circuit generates the one or more multi-byte random keys in response to the series of true random bits utilizing one or more of a von Neumann corrector, an extractor function, and/or a one-way hash function. In another example, the post processing circuit may store a predetermined number (e.g., 128, 256, etc.) of the true random bits with a programmable sampling rate into a plurality of first-in first-out (FIFO) memories. The random data in the FIFO memories may be used as the one or more multi-byte random keys for security related operations (e.g., DRAM scrambling, etc.). The process 200 may then move to the step 214 and terminate.

Figure 8:
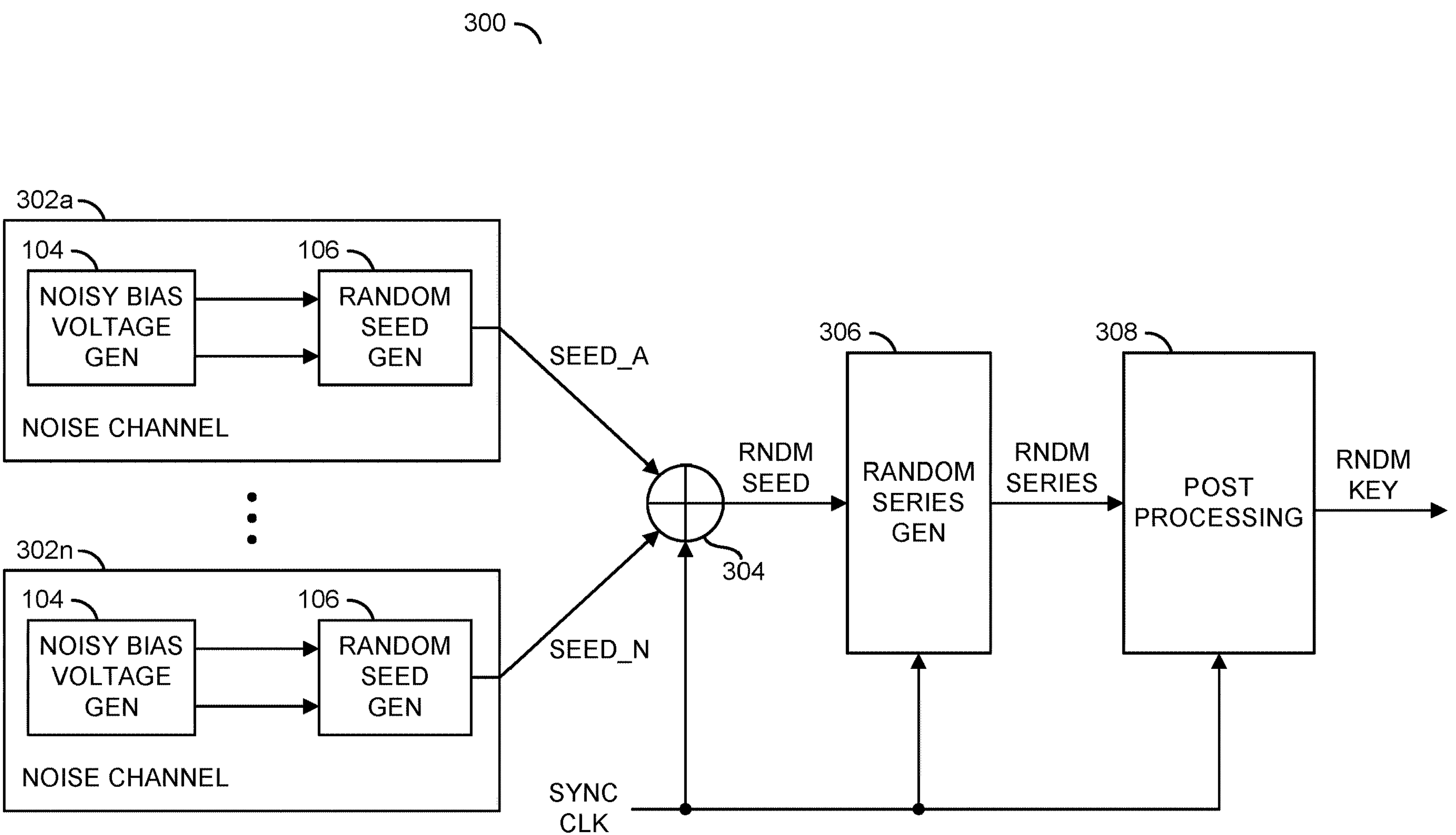
FIG. 8 is a block diagram illustrating a true random number generator circuit in accordance with another example embodiment of the invention.

Referring to FIG. 8, a block diagram of a circuit 300 is shown illustrating a true random number generator circuit in accordance with another example embodiment of the invention. In an example, the circuit 300 may comprise a number of blocks (or circuits) 302*a*-302*n*, a block (or circuit) 304, a block (or circuit) 306, and a block (or circuit) 308. In an example, each of the circuits 302*a*-302*n* may implement a noise channel. The circuit 304 may implement a random seed generator circuit. The circuit 306 may implement a random series generator circuit. In an example, the circuit 306 may be implemented similarly to the circuit 108 described above in connection with FIG. 6. The circuit 308 may implement a post processing circuit. In an example, the circuit 308 may be implemented similarly to the circuit 110 described above in connection with FIG. 1. Each of the circuits 302*a*-302*n* may have an output that may present a signal (e.g., SEED A-SEED N). In an example, the signals SEED A-SEED N may communicate series of pink random seeds. The signals SEED A-SEED N may be presented to inputs of the circuit 304. The circuit 304 may be configured to generate the signal RNDM SEED in response to the signals SEED A-SEED N. In an example, the circuit 304 may implement an Exclusive-OR (XOR) tree.

In an example, the signal RNDM SEED may be presented to a first input of the circuit 306. A signal (e.g., SYNC CLK) may be presented to a second input of the circuit 306. The signal SYNC CLK may be implemented as a clock signal. In an example, the signal SYNC CLK may be configured to synchronize one or more sub-modules of the circuit 300 with each other and/or with other sub-modules of the apparatus containing the circuit 300. In an example, the circuit 306 may be configured to present the signal RNDM SERIES at an output. In an example, the circuit 306 may be configured to whiten the series of pink random seeds generated by the circuit 304. In an example, the circuit 306 may be configured to generate the signal RNDM SERIES in response to the signal RNDM SEED and the signal SYNC CLK. In an example, the signal RNDM SERIES may communicate a series of true random bits.

In an example, the circuit 308 may have a first input that may receive the signal RNDM SERIES, a second input that may receive the signal SYNC CLK, and an output that may present the signal RNDM KEY. The circuit 308 may be configured to generate the signal RNDM KEY in response to the signal RNDM SERIES and the signal SYNC CLK. In an example, the signal RNDM KEY may communicate random key bytes. In an example, the signal RNDM KEY may provide true random security key bytes for communication channel encryption. In an example, the signal RNDM KEY may provide true random security key bytes for dynamic random access memory (DRAM) communication encryption on an integrated circuit (e.g., a system on chip (SoC)).

In an example, the circuit 308 may be configured to generate the random key bytes in response to the series of true random bits utilizing one or more of a von Neumann corrector, an extractor function, and a one-way hash function. In an example embodiment, the circuit 308 may comprise a plurality of first-in first-out (FIFO) memories. In an example, a predetermined number (e.g., 128, 256, etc.) of random bits from the circuit 306 may be stored with a programmable sampling rate into the plurality of FIFO memories. The random data in the FIFO memories may be used as keys for security related operations (e.g., DRAM scrambling, etc.).

In an example, each of the circuits 302*a*-302*n* may comprise a separate instance of the noisy bias voltage generator circuit 104 and a separate instance of the random seed generator circuit 106 (e.g., described above in connection with FIGS. 1-5). Each of the noise channel circuits 302*a*-302*n* generally comprises a separate pair of large series resistances as noise sources. In an example, each of the noise channel circuits 302*a*-302*n* may share the bias voltages VCM1 and VCM2. In an example, current sources for each of the noise channel circuits 302*a*-302*n* may be generated as mirrors of the signals IB1 and IB2.

Figure 9:
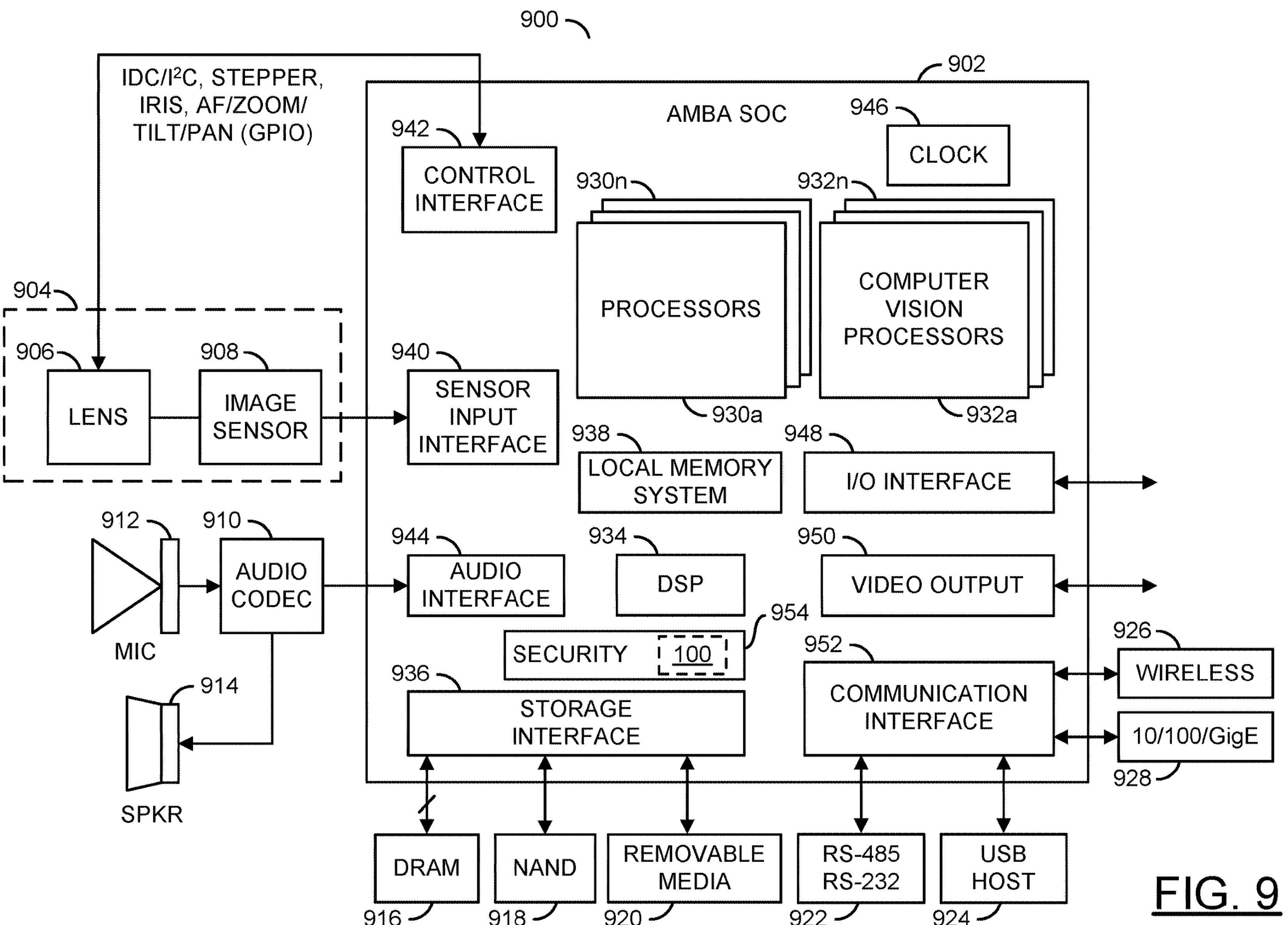
FIG. 9, a diagram of a camera system 900 illustrating an example implementation of a computer vision system in which a true random number generator circuit in accordance with example embodiments of the invention may be utilized.

Referring to FIG. 9, a diagram of a camera system 900 is shown illustrating an example implementation of a computer vision system in which a true random number generator circuit in accordance with example embodiments of the invention may be utilized. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/ firmware that may be configured to implement the circuits and processes described above in connection with FIG. 1 through FIG. 7.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930*a*-930*n*, a number of blocks (or circuits) 932*a*-932*n*, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930*a*-930*n* may be processor circuits. In various embodiments, the circuits 930*a*-930*n* may include one or more embedded processors (e.g., ARM, etc.). The circuits 932*a*-932*n* may implement a number of computer vision related processor circuits. In an example, one or more of the circuits 932*a*-932*n* may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930*a*-930*n*. In response to the computer readable instructions, the processors 930*a*-930*n* may be operational to operate as controllers for the processors 932*a*-932*n*. For example, the resources of the processors 932*a*-932*n* may be configured to efficiently perform various specific operations in hardware and the processors 930*a*-930*n* may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 98 may be implemented in the local memory system 938. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound ($I^2S$) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone, and I/O visualization, and DRAM scrambling. In an example, the security module 958 may include an instance of the circuit 100 implementing a true random number generator in accordance with an embodiment of the invention. In an example, the circuit 100 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IoT, etc. The processor/camera circuit 902 may also include support for communication using one or more of the universal serial bus protocols (e.g., USB 1.0, 2.0, 3.0, etc.).

The functions performed by and structures illustrated in the diagrams of FIGS. 1 to 8 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:

a noisy bias voltage generator circuit configured to generate a plurality of noisy bias voltages in response to a plurality of input voltage signals and a first bias current signal;

a random seed generator circuit configured to generate a random seed in response to said plurality of noisy bias voltages and a second bias current signal; and a random series generator circuit configured to generate a series of true random bits in response to said random seed and a clock signal.

2. The apparatus according to claim 1, further comprising a post processing circuit configured to generate one or more random key bytes in response to said series of true random bits and said clock signal.

3. The apparatus according to claim 2, wherein said post processing circuit is configured to generate said one or more random key bytes in response to said series of true random bits and said clock signal utilizing one or more of a von Neumann corrector, an extractor function, and a one-way hash function.

4. The apparatus according to claim 1, wherein said noisy bias voltage generator circuit comprises:

a resistor array configured to generate a plurality of noise signals in response to said plurality of input voltage signals; and a plurality of amplifier circuits configured to generate said plurality of noisy bias voltages by amplifying said plurality of noise signals.

5. The apparatus according to claim 4, wherein:

said resistor array comprises a first series metal resistance and a second series metal resistance; and said plurality of amplifier circuits comprise a first operational amplifier coupled to said first series metal resistance and a second operational amplifier coupled to said second series metal resistance.

6. The apparatus according to claim 4, wherein said random seed generator circuit comprises:

a plurality of voltage controlled oscillator circuits configured to generate a plurality of oscillator signals comprising a random amount of jitter; and a sampling circuit configured to sample a first of said plurality of oscillator signals using a second of said plurality of oscillator signals.

7. The apparatus according to claim 6, wherein said sampling circuit comprises a D-flip-flop configured to receive said first of said plurality of oscillator signals at a data input, receive said second of said plurality of oscillator signals at a clock input, and present said random seed at an output.

8. The apparatus according to claim 1, wherein said random series generator circuit comprises a linear feedback shift register.

9. The apparatus according to claim 8, wherein said linear feedback shift register comprises:

an odd number of register stages; and a feedback circuit comprising at least one Exclusive_OR logic gate, and said random seed is injected into said linear feedback shift register using an input of said at least one Exclusive_OR logic gate.

10. The apparatus according to claim 8, wherein said linear feedback shift register comprises fifteen register stages and an Exclusive_OR logic gate, and said random seed is injected into a first input of said Exclusive_OR logic gate, an output of a fourteenth register stage is injected into a second input of said Exclusive_OR logic gate, and an output of a fifteenth register stage is injected into a third input of said Exclusive_OR logic gate.

11. A method of generating true random numbers comprising:

generating a plurality of noisy bias voltages in response to a plurality of input voltage signals and a first bias current signal;

generating a random seed in response to said plurality of noisy bias voltages and a second bias current signal; and generating a series of true random bits in response to said random seed and a clock signal.

12. The method according to claim 11, wherein generating said plurality of noisy bias voltages in response to said plurality of input voltage signals and said first bias current signal comprises:

presenting each of said plurality of input voltage signals to a first input of respective amplifier circuits;

presenting each of said plurality of input voltage signals to a respective resistor coupled to a second input of said respective amplifier circuits; and presenting each of said plurality of noisy bias voltages at an output of each of said respective amplifier circuits.

13. The method according to claim 11, wherein generating said random seed in response to said plurality of noisy bias voltages and said second bias current signal comprises:

controlling respective voltage controlled oscillator circuits using said plurality of noisy bias voltages and said second bias current signal; and sampling a first output signal of a first voltage controlled oscillator using a second output signal of a second voltage controlled oscillator to generate said random seed.

14. The method according to claim 13, wherein generating a series of true random bits in response to said random seed and a clock signal comprises:

injecting samples of said first output signal as said random seed into a feedback path of a linear feedback shift register to obtain said series of true random bits.

15. The method according to claim 14, wherein said linear feedback shift register comprises:

an odd number of register stages; and a feedback circuit comprising at least one Exclusive_OR logic gate, and said random seed is injected into said linear feedback shift register using an input of said at least one Exclusive_OR logic gate.

16. The method according to claim 14, wherein:

said linear feedback shift register comprises fifteen register stages and an Exclusive_OR logic gate; and said random seed is injected into a first input of said Exclusive_OR logic gate, an output of a fourteenth register stage is injected into a second input of said Exclusive_OR logic gate, and an output of a fifteenth register stage is injected into a third input of said Exclusive_OR logic gate.

17. The method according to claim 11, further comprising generating random key bytes in response to said series of true random bits and said clock signal.

18. The method according to claim 17, wherein said random key bytes are generated utilizing one or more of a von Neumann corrector, an extractor function, and a one-way hash function.

19. The method according to claim 17, further comprising encrypting a communication channel using said random key bytes.

20. The method according to claim 17, further comprising encrypting dynamic random access memory (DRAM) communication using said random key bytes.

* * * * *